United States Patent
Matsubayashi et al.

(10) Patent No.: US 9,688,868 B2
(45) Date of Patent: Jun. 27, 2017

(54) ELECTRICALLY CONDUCTIVE POLYMER DISPERSION AND ELECTRICALLY CONDUCTIVE COATING FILM

(71) Applicant: SHIN-ETSU POLYMER CO., LTD., Tokyo (JP)

(72) Inventors: Sou Matsubayashi, Saitama (JP); Norimasa Shinada, Saitama (JP); Kazuyoshi Yoshida, Saitama (JP)

(73) Assignee: SHIN-ETSU POLYMER CO., LTD., Tokyo (JP)

( * ) Notice: Subject to any disclaimer, the term of this patent is extended or adjusted under 35 U.S.C. 154(b) by 0 days.

(21) Appl. No.: 15/108,749

(22) PCT Filed: Jan. 9, 2015

(86) PCT No.: PCT/JP2015/050553
§ 371 (c)(1),
(2) Date: Jun. 28, 2016

(87) PCT Pub. No.: WO2015/108001
PCT Pub. Date: Jul. 23, 2015

(65) Prior Publication Data
US 2016/0319137 A1  Nov. 3, 2016

(30) Foreign Application Priority Data

Jan. 14, 2014  (JP) .................. 2014-004468

(51) Int. Cl.
| | |
|---|---|
| H01B 1/00 | (2006.01) |
| C09D 5/24 | (2006.01) |
| H01B 1/12 | (2006.01) |
| C09D 7/12 | (2006.01) |
| C09D 201/00 | (2006.01) |
| C08L 65/00 | (2006.01) |
| C09D 133/06 | (2006.01) |
| C09D 167/02 | (2006.01) |
| C09D 181/02 | (2006.01) |

(52) U.S. Cl.
CPC ............... *C09D 5/24* (2013.01); *C08L 65/00* (2013.01); *C09D 7/12* (2013.01); *C09D 133/068* (2013.01); *C09D 167/02* (2013.01); *C09D 181/02* (2013.01); *C09D 201/00* (2013.01); *H01B 1/124* (2013.01); *H01B 1/127* (2013.01); *H01B 1/128* (2013.01); *C08G 2261/1424* (2013.01); *C08G 2261/3223* (2013.01); *C08G 2261/794* (2013.01); *C08L 2203/206* (2013.01)

(58) Field of Classification Search
CPC ... H01B 1/00; H01B 1/12–1/128; H01B 5/14; C09D 5/24
See application file for complete search history.

(56) References Cited

U.S. PATENT DOCUMENTS

2012/0202072 A1* 8/2012 Asai .................. C08G 61/126
428/419
2014/0211372 A1  7/2014 Sugawara et al.

FOREIGN PATENT DOCUMENTS

| JP | 07-165892 A | 6/1995 |
|---|---|---|
| JP | 2636968 B2 | 8/1997 |
| JP | 2005-126081 A | 5/2005 |
| JP | 2008-296380 A | 12/2008 |
| JP | 2008-297484 A | 12/2008 |
| JP | 2011-195765 A | 10/2011 |
| JP | 2012-241068 A | 12/2012 |
| KR | 20090037322 A | 4/2009 |
| KR | 2010-0109410 | 10/2010 |
| TW | 200832452 A | 8/2008 |
| TW | 201222570 A | 6/2012 |
| WO | 2014/189036 A1 | 11/2014 |

OTHER PUBLICATIONS

International Search Report, corresponding PCT/JP2015/050553, dated Mar. 17, 2015.
Office Action, corresponding Taiwanese Application No. 104101052, dated Apr. 13, 2016.
Korean Office Action for application No. 10-2016-7012909 dated Dec. 14, 2016.

* cited by examiner

Primary Examiner — Mark Kopec
(74) Attorney, Agent, or Firm — Lando & Anastasi, LLP

(57) ABSTRACT

A conductive polymer dispersion is provided which is capable of easily forming a conductive coating film having both excellent water resistance and excellent solvent resistance.
The conductive polymer dispersion of the present invention includes a π-conjugated conductive polymer, a polyanion, a polyester resin having an alkali metal salt of an acid group, and a glycidyl group-containing acrylic resin. In the conductive polymer dispersion, the ratio (α/β) of total mass α of the polyester resin and the glycidyl group-containing acrylic resin to total mass β of the π-conjugated conductive polymer and the polyanion is in a range of 6.90 to 62.5.

5 Claims, No Drawings

ELECTRICALLY CONDUCTIVE POLYMER DISPERSION AND ELECTRICALLY CONDUCTIVE COATING FILM

CROSS-REFERENCE TO RELATED APPLICATIONS

This application is a U.S. national stage application and claims the benefit under 35 U.S.C. §371 of PCT/JP2015/050553, titled ELECTRICALLY CONDUCTIVE POLYMER DISPERSION AND ELECTRICALLY CONDUCTIVE COATING FILM, filed Jan. 9, 2015, which claims priority to Japanese Patent Application No. 2014-004468, filed Jan. 14, 2014, which patent applications are hereby incorporated herein by reference in their entireties for all purposes.

TECHNICAL FIELD

The present invention relates to a conductive polymer dispersion containing a π-conjugated conductive polymer and a conductive coating film.

BACKGROUND ART

A π-conjugated conductive polymer, which is composed of a conjugated system having a main chain containing π-electrons, can be synthesized by an electrolytic polymerization method and a chemical oxidation polymerization method.

In the electrolytic polymerization method, a π-conjugated conductive polymer on a substrate is formed into a film by dipping a substrate, such as a preformed electrode material, into a mixed solution of an electrolyte as a dopant and a precursor monomer for forming a π-conjugated conductive polymer. Therefore, it was difficult to manufacture a π-conjugated conductive polymer in large quantities.

On the other hand, in the chemical oxidation polymerization method, there are no restrictions such as those in the electrolytic polymerization method, and it is possible to manufacture a large amount of a π-conjugated conductive polymer in the solution by adding an oxidizing agent and an oxidation polymerization catalyst to a precursor monomer of a π-conjugated conductive polymer.

However, in the chemical oxidation polymerization method, since the solubility of a π-conjugated conductive polymer in a solvent becomes poor with the growth of a conjugated system of the main chain of the π-conjugated conductive polymer, insoluble solid powder is obtained. It is difficult to uniformly form a π-conjugated conductive polymer film on the surface of a substrate using an insoluble solid powder.

Therefore, a method of solubilizing a π-conjugated conductive polymer by the introduction of a functional group, a method of solubilizing a π-conjugated conductive polymer by the dispersion in a binder, and a method of solubilizing a π-conjugated conductive polymer by the addition of polyanions have been proposed.

For example, in order to improve the dispersibility in water, a method has been proposed of manufacturing an aqueous poly(3,4-dialkoxythiophene) dispersion by the chemical oxidation polymerization of 3,4-dialkoxythiophene using an oxidizing agent under the presence of polystyrene sulfonic acid, which is a polyanion having a molecular weight in a range of 2,000 to 500,000 (refer to PTL 1). Further, a method has been proposed of manufacturing an aqueous π-conjugated conductive polymer colloid dispersion by chemical oxidation polymerization under the presence of polyacrylic acid (refer to PTL 2).

CITATION LIST

Patent Literature

[PTL 1] Japanese Patent No. 2636968
[PTL 2] Japanese Unexamined Patent Application, First Publication No. H7-165892

SUMMARY OF INVENTION

Technical Problem

According to the methods described in PTL 1 and PTL 2, an aqueous dispersion containing a π-conjugated conductive polymer can be easily manufactured. However, a conductive coating film formed by applying the π-conjugated conductive polymer dispersion manufactured by these methods has a problem of low water resistance and low solvent resistance.

The present invention has been made in view of solving the above problem, and an object of the present invention is to provide a conductive polymer dispersion capable of easily forming a conductive coating film having both excellent water resistance and excellent solvent resistance. Another object of the present invention is to provide a conductive coating film having both excellent water resistance and excellent solvent resistance.

Solution to Problem

The present invention has the following aspects.

[1] A conductive polymer dispersion, including: a π-conjugated conductive polymer; a polyanion; a polyester resin having an alkali metal salt of an acid group; and a glycidyl group-containing acrylic resin.

[2] The conductive polymer dispersion according to [1], wherein the ratio (α/β) of total mass α of the polyester resin and the glycidyl group-containing acrylic resin to total mass β of the π-conjugated conductive polymer and the polyanion is in a range of 6.90 to 62.5.

[3] The conductive polymer dispersion according to [1] or [2], wherein the polyester resin is a polycondensate of a dicarboxylic acid component and a diol component, the dicarboxylic acid component includes a dicarboxylic acid having a sulfonic acid alkali metal salt type substituent group ($-SO_3^-X^+$, here, $X^+$ is an alkali metal ion), and the diol component includes diethylene glycol.

[4] The conductive polymer dispersion according to any one of [1] to [3], further including a conductivity improver.

[5] The conductive polymer dispersion according to [4], wherein the conductivity improver is gallic acid or an ester of gallic acid.

[6] A conductive coating film formed by applying the conductive polymer dispersion according to any one of [1] to [5].

Advantageous Effects of Invention

According to the conductive polymer dispersion of the present invention, a conductive coating film having both excellent water resistance and excellent solvent resistance can be easily formed.

The conductive coating film of the present invention has both excellent water resistance and excellent solvent resistance.

DESCRIPTION OF EMBODIMENTS

<Conductive Polymer Dispersion>

The conductive polymer dispersion of the present invention includes a π-conjugated conductive polymer, a polyanion, a polyester resin having an alkali metal salt of an acid group (hereinafter, referred to as "polyester resin (1)"), and a glycidyl group-containing acrylic resin.

In the conductive polymer dispersion of the present invention, the ratio (α/β) of total mass α of the polyester resin (1) and the glycidyl group-containing acrylic resin to total mass β of the π-conjugated conductive polymer and the polyanion is preferably in a range of 6.90 to 62.5. Both α and β are mass of solid matter, that is, non-volatile matter.

If the α/β is less than the lower limit value, the conductive polymer dispersion is repelled from a substrate, and thus it is difficult to form a conductive coating film. If the α/β is more than the upper limit value, water resistance and solvent resistance are lowered. That is, if the α/β is equal to or greater than the lower limit value, a conductive coating film can be advantageously formed without repelling the conductive polymer dispersion from a substrate, and if the α/β is equal to or less than the upper limit value, sufficient water resistance and solvent resistance can be obtained.

(π-Conjugated Conductive Polymer)

The π-conjugated conductive polymer can be used as long as it is an organic polymer whose main chain is composed of a π-conjugated system. Here, the "main chain" refers to a repeating structure of a single bond and a double bond. Examples of the π-conjugated conductive polymer may include polypyrroles, polythiophenes, polyacetylenes, polyphenylenes, polyphenylene vinylenes, polyanilines, polyacenes, and polythiophene vinylenes, and may also include copolymers of two or more monomer components constituting these polymers. From the viewpoint of ease of polymerization and stability in the air, polypyrroles, polythiophenes, and polyanilines are preferable.

The π-conjugated conductive polymer can obtain sufficient conductivity and compatibility with a binder even when it is left unsubstituted. However, in order to further increase conductivity and dispersibility or solubility in a binder, it is preferable to introduce a functional group, such as an alkyl group, a carboxy group, a sulfo group, an alkoxy group, a hydroxy group, or a cyano group, into the π-conjugated conductive polymer. Here, the alkyl group may be a linear or branched alkyl of 1 to 20 carbon atoms, and the alkoxy group may be a linear or branched alkoxy of 1 to 20 carbon atoms.

Specific examples of the π-conjugated conductive polymer include polypyrrole, poly(N-methylpyrrole), poly(3-methylpyrrole), poly(3-ethylpyrrole), poly(3-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly (3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly (3-ethoxypyrrole), poly(3-butoxypyrrole), poly(3-hexyloxypyrrole), poly(3-methyl-4-hexyloxypyrrole), polythiophene, poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly (3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioctyloxythiophene), poly(3,4-didecyloxythiophene), poly(3,4-didodecyloxythiophene), poly(3,4-ethylenedioxythiophene), poly(3,4-propylenedioxythiophene), poly(3,4-butenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene), poly(3-methyl-4-carboxybutylthiophene), polyaniline, poly(2-methylaniline), poly(3-isobutylaniline), poly (2-aniline sulfonic acid), and poly (3-aniline sulfonic acid).

The above-described π-conjugated conductive polymers may be used alone or in combination with two or more thereof.

Among the π-conjugated conductive polymers, polymers selected from polypyrrole, polythiophene, poly(N-methylpyrrole), poly(3-methylthiophene), poly(3-methoxythiophene), and poly(3,4-ethylenedioxythiophene), or copolymers composed of two or more of monomer components constituting these polymers are appropriately used, from the viewpoint of resistance value and reactivity. Further, polypyrrole and poly(3,4-ethylenedioxythiophene) are more preferable from the viewpoint of improving heat resistance in addition to making conductivity higher. Particularly, poly(3,4-ethylenedioxythiophene) is preferable.

Further, it is preferable that volume conductivity be 0.1 S/cm or more.

(Polyanion)

The polyanion is a polymer composed of only a constituent unit having an anion group, or a polymer composed of a constituent unit having an anion group and a constituent unit not having an anion group.

As the anion group of the polyanion, $-O-SO_3^-X^+$, $-SO_3^-X^+$, and $-COO^-X^+$ (in each Formula, $X^+$ represents a hydrogen ion or an alkali metal ion) are exemplified.

That is, the polyanion is a polymeric acid containing at least one of a sulfo group and a carboxy group. Among these, from the viewpoint of the doping effect on the π-conjugated conductive polymer, a polyanion having $-SO_3^-X^+$ or $-COO^-X^+$ as the anion group is preferable.

Further, it is preferable that these anion groups be disposed in the main chain of the polyanion adjacent to each other or at a predetermined interval.

Among the above-described polyanions, from the viewpoint of solvent solubility and conductivity, polyisoprene sulfonic acid, a copolymer containing polyisoprene sulfonic acid, poly(2-sulfoethyl methacrylate), a copolymer containing poly(2-sulfoethyl methacrylate), poly(4-sulfobutyl methacrylate), a copolymer containing poly(4-sulfobutyl methacrylate), polymethallyloxybenzene sulfonic acid, a copolymer containing polymethallyloxybenzene sulfonic acid, polystyrene sulfonic acid, and a copolymer containing polystyrene sulfonic acid are preferable. Particularly, polystyrene sulfonic acid is preferable.

The above-described polyanions may be used alone or in combination with two or more thereof.

The polymerization degree of the polyanion is preferably in a range of 10 to 100,000 monomer units, and, from the viewpoint of solvent solubility and conductivity, is more preferably in a range of 50 to 10,000 monomer units. As this polyanion, a commercially available product can be used, and this polyanion can also be manufactured by a known method or a method analogous thereto.

The content of the polyanion is preferably in a range of 0.1 g to 10 g, and more preferably in a range of 1 g to 7 g, with respect to 1 g of the π-conjugated conductive polymer. If the content of the polyanion with respect to 1 g of the π-conjugated conductive polymer is less than 0.1 g, the doping effect on the π-conjugated conductive polymer tends to be weak, and conductivity becomes insufficient. In addition to this, the dispersibility and solubility in a solvent is lowered, and it is difficult to obtain a uniform dispersion. That is, if the content of the polyanion with respect to 1 g of the π-conjugated conductive polymer is 0.1 g or more, sufficient doping effects on the π-conjugated conductive polymer and sufficient conductivity can be obtained, the dispersibility and solubility in a solvent become good, and a uniform dispersion can be obtained. Further, if the content of the polyanion with respect to 1 g of the π-conjugated conductive polymer is more than 10 g, the content of the π-conjugated conductive polymer is lowered, and thus it is also difficult to obtain sufficient conductivity. That is, if the content of the polyanion with respect to 1 g of the π-conjugated conductive polymer is 10 g or less, the content of the π-conjugated conductive polymer is sufficient, and thus good conductivity is obtained.

A part of the anion group of the polyanion is coordinated to the π-conjugated conductive polymer, and the π-conjugated conductive polymer and the polyanion form a complex. When the anion group of the polyanion is coordinated to the π-conjugated conductive polymer, the π-conjugated conductive polymer is doped to express conductivity. The anion group of the polyanion which is not coordinated to the π-conjugated conductive polymer serves to solubilize this complex in water.

(Polyester Resin (1))

The polyester resin (1) contained in the conductive polymer dispersion of the present invention is a polycondensate of a dicarboxylic acid component and a diol component, and is a polyester resin having an alkali metal salt of an acid group (a sulfonic acid group, a carboxylic acid group, a phosphoric acid group, or the like). Since this polyester resin (1) has high polarity, it has excellent dispersibility in a dispersion medium, particularly in water, and can be stably dispersed in a dispersion medium, particularly in water, without using an emulsifier or a stabilizer.

Examples of the dicarboxylic acid component include aromatic dicarboxylic acids, such as phthalic acid, terephthalic acid, dimethyl terephthalate, isophthalic acid, dimethyl isophthalate, 2,5-dimethyl terephthalic acid, 2,6-naphthalene dicarboxylic acid, biphenyl dicarboxylic acid, and orthophthalic acid; aliphatic dicarboxylic acids, such as succinic acid, adipic acid, azelaic acid, sebacic acid, and dodecanoic dicarboxylic acid; and alicyclic dicarboxylic acids, such as cyclohexanedicarboxylic acid. These dicarboxylic acids may be used alone or in combination with two or more thereof.

It is preferable that the dicarboxylic acid component includes a dicarboxylic acid having a sulfonic acid alkali metal salt type substituent group ($-SO_3^-X^+$, here, $X^+$ is an alkali metal ion) in which a sulfonic acid group is neutralized by an alkali metal.

The dicarboxylic acid having a sulfonic acid alkali metal salt type substituent group is a compound in which a sulfonic acid group in a dicarboxylic acid having a sulfonic acid group is an alkali metal salt.

Examples of the dicarboxylic acid having a sulfonic acid group include sulfoterephthalic acid, 5-sulfoisophthalic acid, 4-sulfoisophthalic acid, 4-sulfonaphthalene-2,7-dicarboxylic acid, and derivatives thereof. Examples of the alkali metal include sodium and potassium.

The dicarboxylic acid having a sulfonic acid alkali metal salt type substituent group is preferably a sodium salt of 5-sulfoisophthalic acid and a derivative thereof.

The dicarboxylic acid component other than the dicarboxylic acid having a sulfonic acid alkali metal salt type substituent group in the dicarboxylic acid component is preferably an aromatic dicarboxylic acid, and more preferably terephthalic acid or isophthalic acid. The aromatic nucleus of an aromatic dicarboxylic acid has high affinity with hydrophobic plastic, high adhesivity to amorphous polyester, and excellent hydrolysis resistance.

The dicarboxylic acid having a sulfonic acid alkali metal salt type substituent group is contained in an amount of preferably 6 mol % to 20 mol %, and more preferably 10 mol % to 18 mol %, with respect to the moles of the total dicarboxylic acid component. If the content of the dicarboxylic acid having a sulfonic acid alkali metal salt type substituent group is equal to or greater than the lower limit value, the dispersion time of the polyester resin (1) in water can be shortened, and the solvent resistance of the polyester resin (1) can be further improved. Further, if the content thereof is equal to or less than the upper limit value, the water resistance of the polyester resin (1) can be further improved.

Examples of the diol component forming the polyester resin (1) include diethylene glycol, aliphatic glycols of 2 to 8 carbon atoms, and alicyclic glycols of 6 to 12 carbon atoms. Specific examples of the aliphatic glycols of 2 to 8 carbon atoms and the alicyclic glycols of 6 to 12 carbon atoms include ethylene glycol, 1,3-propanediol, 1,2-propylene glycol, neopentyl glycol, 1,4-butanediol, 1,4-cyclohexanedimethanol, 1,3-cyclohexanedimethanol, 1,2-cyclohexanedimethanol, 1,6-hexanediol, p-xylylene glycol, and triethylene glycol. Particularly, ethylene glycol and diethylene glycol are preferable. They may be used alone or in combination of two or more thereof.

It is preferable that the diol component includes diethylene glycol from the viewpoint of further improving water resistance and solvent resistance.

In the case where the diol component contains diethylene glycol, it is preferable that the diethylene glycol be contained in an amount of 20 mol % to 80 mol % with respect to the moles of the total glycol component. Even in the case where the content of the diethylene glycol is out of the above range, solvent resistance to alcohols is obtained, but, if the content of the diethylene glycol is out of the above range, solvent resistance to aromatic solvents other than alcohols, such as toluene and xylene, is insufficient. That is, if the content of the diethylene glycol is within the above range, sufficient solvent resistance to alcohols as well as aromatic solvents other than alcohols, such as toluene and xylene, is obtained.

The number average molecular weight of the polyester resin (1) is preferably 2,000 to 30,000, and more preferably 2,500 to 25,000. The number average molecular weight thereof is measured by gel permeation chromatography, and is a value determined based on standard polystyrene.

If the number average molecular weight of the polyester resin (1) is equal to or greater than the lower limit value, the water resistance and solvent resistance of the polyester resin (1) are further improved, and, if the number average molecular weight is equal to or less than the upper limit value, the dispersibility of the polyester resin (1) in a dispersion medium, particularly in water, is further improved.

The polyester resin (1) may be used alone or in combination with two or more.

The method of manufacturing the polyester resin (1) is not particularly limited. For example, an esterification or an ester exchange reaction was performed by stirring equivalent amounts of the dicarboxylic acid component and the diol component or an excess amount of one of the dicarboxylic acid component and the diol component for 0.1 hours to 120 hours while heating the dicarboxylic acid component and the diol component at 130° C. to 200° C. in the presence of a solvent or in the absence of a solvent so as to obtain a reaction product, and the reaction product was polycondensed at 200° C. to 250° C. for 0.1 hours to 120 hours under a reduced pressure condition of a vacuum degree of 30 mmHg or lower, and preferably a vacuum degree of 10 mmHg or lower, thereby manufacturing the polyester resin (1). This manufacturing method is advantageous when the reaction smoothly proceeds using a reaction catalyst. Examples of the reaction catalyst include metal acetates, such as zinc acetate and manganese acetate; metal oxides, such as antimony oxide and germanium oxide; and titanium compounds.

The obtained polyester resin (1) may be added to a dispersion medium such as water to form a dispersion. If the solid concentration in the water dispersion of the polyester resin (1) is high, it is difficult to obtain a uniform dispersion. Therefore, it is preferable that the content of polyester solids be 30% by mass or less with respect to the total mass of the dispersion of the polyester resin.

(Glycidyl Group-Containing Acrylic Resin)

The glycidyl group-containing acrylic resin is a homopolymer of a glycidyl group-containing radical-polymerizable unsaturated monomer, or a copolymer of a glycidyl group-containing radical-polymerizable unsaturated monomer and another radical-polymerizable unsaturated monomer copolymerizable with this monomer.

Examples of the glycidyl group-containing radical-polymerizable unsaturated monomer include glycidyl ethers, such as glycidyl acrylate, glycidyl methacrylate, and allyl glycidyl ether. Particularly, glycidyl methacrylate is preferable. The glycidyl group-containing radical-polymerizable unsaturated monomer may be used alone or in combination with two or more.

The content of the glycidyl group-containing radical-polymerizable unsaturated monomer is preferably 10% by mass to 100% by mass, and more preferably 20% by mass to 100% by mass, with respect to the total mass of the glycidyl group-containing radical-polymerizable unsaturated monomer and another radical-polymerizable unsaturated monomer copolymerizable with this monomer. Here, a content of 100% by mass means that, in addition to the glycidyl group-containing radical-polymerizable unsaturated monomer, another radical-polymerizable unsaturated monomer copolymerizable with this monomer is not used, and means that the glycidyl group-containing acrylic resin is a homopolymer of the glycidyl group-containing radical-polymerizable unsaturated monomer.

It is considered that the glycidyl group-containing acrylic resin has a glycidyl group-containing radical-polymerizable unsaturated monomer unit, thereby promoting self-crosslinking and improving water resistance and solvent resistance. Particularly, the improvement in solvent resistance to a ketone solvent, such as acetone or methyl ethyl ketone, and an ester solvent, such as ethyl acetate or butyl acetate, is remarkable.

Even in the case where the content of the glycidyl group-containing radical-polymerizable unsaturated monomer is less than 10% by mass with respect to the total mass of the glycidyl group-containing radical-polymerizable unsaturated monomer and another radical-polymerizable unsaturated monomer copolymerizable with this monomer, solvent resistance to alcohol is obtained, but solvent resistance to a ketone solvent, such as acetone or methyl ethyl ketone, and an ester solvent, such as ethyl acetate or butyl acetate, is insufficient. That is, in order to obtain sufficient solvent resistance to a ketone solvent, such as acetone or methyl ethyl ketone, and an ester solvent, such as ethyl acetate or butyl acetate, as well as to alcohol, it is required that the content be 10% by mass or more.

Examples of another radical-polymerizable unsaturated monomer copolymerizable with the glycidyl group-containing radical-polymerizable unsaturated monomer include vinyl esters, unsaturated carboxylic acid esters, unsaturated carboxylic acid amides, unsaturated nitriles, unsaturated carboxylic acids, allyl compounds, nitrogen-containing vinyl monomers, hydrocarbon vinyl monomers, and vinyl silane compounds. Another radical-polymerizable unsaturated monomer may be used alone or in combination with two or more thereof.

As said another radical-polymerizable unsaturated monomer, from the viewpoint of further effects of improving solvent resistance being further exhibited, an unsaturated carboxylic acid monomer, such as acrylic acid or methacrylic acid, is preferably used. Particularly, among (meth) acrylic acid esters, methyl methacrylate and butyl acrylate are preferable.

In the case where an unsaturated carboxylic acid monomer is used as said another radical-polymerizable unsaturated monomer, the content of the unsaturated carboxylic acid monomer is preferably 5% by mass to 50% by mass, with respect to the total mass of the glycidyl group-containing radical-polymerizable unsaturated monomer and another radical-polymerizable unsaturated monomer copolymerizable with this monomer. If the content of the unsaturated carboxylic acid monomer is equal to or greater than the lower limit value, the effect of a combination of the unsaturated carboxylic acid monomer, that is, the effect of improvement of solvent resistance by crosslinking with a glycidyl group is sufficiently exhibited. If the content thereof is equal to or less than the upper limit value, it is possible to suppress the deterioration of storage stability due to the gelation of liquid over time.

The method of manufacturing the glycidyl group-containing acrylic resin is not particularly limited. For example, the glycidyl group-containing acrylic resin can be manufactured by emulsion polymerization.

In the manufacture of the glycidyl group-containing acrylic resin by emulsion polymerization, for example, 10 to 1,000 parts by mass of ion-exchange water, 1 to 10 parts by mass of a polymerization initiator, and 1 to 20 parts by mass of a surfactant are put into a reaction tank, 10 to 1,000 parts by mass of ion-exchange water and 1 to 20 parts by mass of a surfactant are put into a dropping tank, and 100 parts by mass of a monomer constituting the glycidyl group-containing acrylic resin are added thereto, so as to obtain an emulsion, and then this emulsion is added dropwise into the dropping tank to perform emulsion radical polymerization. Reaction temperature depends on the reactivity of the monomer used, but is preferably 60° C. to 100° C. Reaction time is preferably 4 hours to 10 hours.

As the surfactant used in emulsion polymerization, one or more of an anionic surfactant, a nonionic reactive surfactant, and a nonreactive surfactant can be used. It is preferable to use an anionic surfactant.

As the polymerization initiator used in emulsion polymerization, a general radical-polymerizable initiator can be used. Examples of the general radical-polymerizable initiator include water-soluble peroxides, such as potassium persulfate, ammonium persulfate, and hydrogen peroxide; oil-soluble peroxides, such as benzoyl peroxide and t-butyl hydroperoxide; and azo compounds, such as azobisisobutyronitrile.

The obtained glycidyl group-containing acrylic resin may be added to a dispersion medium such as water to form a dispersion. If the solid matter concentration in the dispersion of the glycidyl group-containing acrylic resin is high, it is difficult to obtain a uniform dispersion. Therefore, it is preferable that the mass of polyester solids be 30% by mass or less with respect to the total mass of the dispersion of the glycidyl group-containing acrylic resin.

The glycidyl group-containing acrylic resin is made into a self-crosslinkable resin by the combination with the polyester resin (1).

For suitable self-crosslinking, the solid mass ratio of the polyester resin (1)/the glycidyl group-containing acrylic resin is preferably 10/90 to 80/20, and more preferably 20/80 to 70/30.

Specifically, with respect to the total mass of the polyester resin (1) and the glycidyl group-containing acrylic resin, if the content of the polyester resin (1) is 10% by mass or more, that is, if the content of the glycidyl group-containing acrylic resin is 90% by mass or less, adhesivity to an amorphous polyester substrate and transparency of an antistatic coating film are further improved. Further, if the content of the polyester resin (1) is 80% by mass or less, that is, if the content of the glycidyl group-containing acrylic resin is 20% by mass or more, water resistance and solvent resistance are further improved.

(Conductivity Improver)

The conductive polymer dispersion may contain a conductivity improver in order to further improve the conductivity of the obtained conductive coating film.

Specifically, the conductivity improver is at least one compound selected from the group consisting of an acrylic compound, a nitrogen-containing aromatic cyclic compound, a compound having two or more hydroxy groups, a compound having two or more carboxy groups, a compound having one or more hydroxy groups and one or more carboxy groups, a compound having an amide group, a compound having an imide group, a lactam compound, a compound having a glycidyl group, and a water-soluble organic solvent.

Specific examples of these compounds are described in Japanese Unexamined Patent Application, First Publication No. 2010-87401, and are as follows.

Examples of the acrylic compound may include acrylamides, such as N-methyl acrylamide, N-methyl methacrylamide, N-ethyl acrylamide, N-ethyl methacrylamide, N,N-dimethyl acrylamide, N,N-dimethyl methacrylamide, N,N-diethyl acrylamide, N,N-diethyl methacrylamide, 2-hydroxyethyl acrylamide, 2-hydroxyethyl methacrylamide, N-methylol acrylamide, and N-methylol methacrylamide; and acrylic acid esters, such as glycidyl acrylate and glycidyl methacrylate.

Examples of the nitrogen-containing aromatic cyclic compound include pyridines containing one nitrogen atom and derivatives thereof, imidazoles containing two nitrogen atoms and derivatives thereof, pyrimidines and derivatives thereof, pyrazines and derivatives thereof, and triazines containing three nitrogen atoms and derivatives thereof.

Examples of the compound having two or more hydroxy groups include polyhydric aliphatic alcohols, such as propylene glycol, 1,3-butylene glycol, and 1,4-butylene glycol; polymer alcohols, such as cellulose, polysaccharide, and sugar alcohol; aromatic compounds, such as 1,4-dihydroxybenzene, 1,3-dihydroxybenzene, 2,3-dihydroxy-1-pentadecylbenzene, dihydroxybenzoic acid, gallic acid, methyl gallate, and ethyl gallate; and potassium hydroquinone sulfonate.

Examples of the compound having two or more carboxy groups include aliphatic carboxylic acid compounds, such as maleic acid, fumaric acid, and itaconic acid; and aromatic carboxylic acid compounds in which at least one carboxy group is bonded to an aromatic ring, such as phthalic acid, terephthalic acid, and isophthalic acid.

Examples of the compound having one or more hydroxy groups and one or more carboxy groups include tartaric acid, glyceric acid, dimethylolbutanoic acid, dimethylolpropanoic acid, D-glucaric acid, and glutaconic acid.

Examples of the compound having an amide group include a compound having an amide bond represented by —C(=O)—NH— in a molecule and having functional groups at both ends of the bond, a compound in which a cyclic compound is bonded to one end of the bond, and urea having hydrogen at both ends of the bond as functional groups, and urea derivatives.

Examples of the compound having an imide group include phthalimide and phthalimide derivatives, succinimide and succinimide derivatives, benzimide and benzimide derivatives, maleimide and maleimide derivatives, and naphthalimide and naphthalimide derivatives.

Examples of the lactam compound include pentanol-4-lactam, 4-pentanelactam-5-methyl-2-pyrrolidone, 5-methyl-2-pyrrolidinone, hexano-6-lactam, and 6-hexanelactam.

Examples of the compound having a glycidyl group include ethyl glycidyl ether, butyl glycidyl ether, t-butyl glycidyl ether, allyl glycidyl ether, benzyl glycidyl ether, glycidyl phenyl ether, bisphenol A, and diglycidyl ether.

Examples of the water-soluble organic solvent include polar solvents, such as N-methyl-2-pyrrolidone, N-methylacetamide, N,N-dimethylformamide, N,N-dimethylacetamide, dimethyl sulfoxide, hexamethylphosphoric triamide, N-vinylpyrrolidone, N-vinylformamide, and N-vinylacetamide; phenols, such as cresol, phenol, and xylenol; polyhydric aliphatic alcohols, such as ethylene glycol, propylene glycol, dipropylene glycol, 1,3-butylene glycol, 1,4-butylene glycol, D-glucose, D-glucitol, isoprene glycol, butanediol, 1,5-pentanediol, 1,6-hexanediol, 1,9-nonanediol, and neopentyl glycol; carbonate compounds, such as ethylene carbonate and propylene carbonate; ether compounds, such as dioxane and diethyl ether; chained ethers, such as dialkyl ether, propylene glycol dialkyl ether, polyethylene glycol dialkyl ether, and polypropylene glycol dialkyl ether; heterocyclic compounds, such as 3-methyl-2-oxazolidinone; and nitrile compounds, such as acetonitrile, glutaronitrile, methoxyacetonitrile, propionitrile, and benzonitrile.

Among the conductivity improvers, a compound having two or more hydroxy groups is preferable, and aromatic compounds, such as 1,4-dihydroxybenzene, 1,3-dihydroxybenzene, 2,3-dihydroxy-1-pentadecylbenzene, dihydroxybenzoic acid, gallic acid, methyl gallate, and ethyl gallate, are particularly preferable. Among these, from the viewpoint of improving thermal stability to further increase the conductivity of a conductive coating film, a compound having two or more hydroxyl groups, such as gallic acid or an ester of gallic acid, and dihydroxybenzoic acids, such as resorcylic acid, pyrocatechuic acid, gentisic acid, protocatechuic acid, and esters thereof is preferable. Among these, gallic acid or an ester of gallic acid is preferable, and gallic acid is further preferable. Gallic acid or an ester of gallic acid is represented by Chemical Formula (1) below.

Specific examples of R in Chemical Formula (1) below include, but are not limited to, a hydrogen atom, an alkyl group (for example, a methyl group, an ethyl group, a n-propyl group, an isopropyl group, an n-butyl group, a t-butyl group, an n-hexyl group, an isohexyl group, a t-hexyl group, or a sec-hexyl group), an alkenyl group (for example, a vinyl group, a propenyl group, or butenyl group), a cycloalkyl group (for example, a cyclohexyl group or a cyclopentyl group), a cycloalkenyl group (for example, a cyclohexenyl group), an aryl group (for example, a naphthyl group), and an aralkyl group (for example, a benzyl group or a phenethyl group).

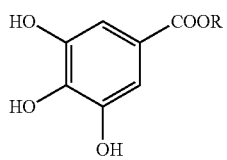

(1)

The conductivity improver may be used alone or in combination with two or more.

The content of the conductivity improver is preferably 0.1 times to 1000 times (mass), and more preferably 2 times to 100 times (mass), with respect to the total mass of the $\pi$-conjugated conductive polymer and the polyanion. If the content of the conductivity improver is equal to or greater than the lower limit value, the conductivity improving effect due to the addition of the conductivity improver can be sufficiently exhibited. Further, if the content thereof is equal to or less than the upper limit value, it is possible to prevent the deterioration of conductivity due to the decrease in the concentration of the $\pi$-conjugated conductive polymer.

(Dispersion Medium)

Examples of the dispersion medium contained in the conductive polymer dispersion include polar solvents, such as water, N-methyl-2-pyrrolidone, N,N-dimethylformamide, N,N-dimethylacetamide, dimethyl sulfoxide, hexamethylphosphoric triamide, and acetonitrile; phenols, such as cresol, phenol, and xylenol; alcohols, such as methanol, ethanol, propanol, and butanol; ketones, such as acetone and methyl ethyl ketone; hydrocarbons, such as hexane, benzene, and toluene; carboxylic acids, such as formic acid and acetic acid; carbonate compounds, such as ethylene carbonate and propylene carbonate; ether compounds, such as dioxane and diethyl ether; chained ethers, such as ethylene glycol dialkyl ether, propylene glycol dialkyl ether, polyethylene glycol dialkyl ether, and polypropylene glycol dialkyl ether; heterocyclic compounds, such as 3-methyl-2-oxazolidinone; and nitrite compounds, such as acetonitrile, glutarodinitrile, methoxyacetonitrile, and propionitrile. These solvents may be used alone, may be used in a mixture of two or more, or may be a mixture with other organic solvents. Among these, water, methanol, ethanol, isopropanol, or a mixture thereof is preferable. Particularly, a dispersion medium containing water is preferable, and it is further preferable that water be used as the dispersion medium.

Here, "conductive polymer dispersion" means a state in which polymers containing a polymer having conductivity are dispersed in a dispersion medium, and "being dispersed" means that these polymers may substantially uniformly exist in the dispersion medium. Therefore, "conductive polymer dispersion" is satisfied if polymers containing a polymer having conductivity substantially uniformly exist in the dispersion, but, for example, the content of these polymers with respect to the mass of the conductive polymer dispersion is 0.1% by mass to 90% by mass, preferably 0.5% by mass to 50% by mass, and further preferably 1% by mass to 25% by mass. Here, "polymers containing a polymer having conductivity" refers to a combination of a $\pi$-conjugated conductive polymer, a polyanion, a polyester resin having an alkali metal salt of an acid group, and a glycidyl group-containing acrylic resin. "Conductive polymer dispersion" refers to a combination of the above polymers containing a polymer having conductivity, a dispersion medium, a conductivity improver, if added, and the following additives.

(Additives)

The conductive polymer dispersion may contain additives, as needed. These additives can be contained in a total amount of 0% by mass to 5% by mass with respect to the mass of the conductive polymer dispersion.

The additive is not particularly limited as long as it can be mixed with a $\pi$-conjugated conductive polymer and a polyanion. For example, an inorganic conducting agent, a surfactant, a defoamer, a coupling agent, an antioxidant, and an ultraviolet absorber can be used.

Examples of the inorganic conducting agent include metal ions (formed by dissolving a metal salt in water) and conductive carbon.

Examples of the surfactant include anionic surfactants, such as a carboxylic acid salt, a sulfonic acid salt, a sulfuric acid ester salt, and a phosphoric acid ester salt; cationic surfactants, such as an amine salt and a quaternary ammonium salt; amphoteric surfactants, such as carboxybetaine, an aminocarboxylic acid salt, and imidazolium betaine; and nonionic surfactants, such as polyoxyethylene alkyl ethers, polyoxyethylene glycerin fatty acid esters, ethylene glycol fatty acid esters, and polyoxyethylene fatty acid amides.

Examples of the defoamer include a silicone resin, and polydimethylsiloxane.

Examples of the coupling agent include silane coupling agents having a vinyl group, an amino group, and an epoxy group.

Examples of the antioxidant include phenol-based antioxidants, amine-based antioxidants, phosphorus-based antioxidants, sulfur-based antioxidants, saccharides, and vitamins.

Examples of the ultraviolet absorber include benzotriazole-based ultraviolet absorbers, benzophenone-based ultraviolet absorbers, salicylate-based ultraviolet absorbers, cyanoacrylate-based ultraviolet absorbers, oxanilide-based ultraviolet absorber, hindered amine-based ultraviolet absorbers, and benzoate-based ultraviolet absorbers. It is preferable that the antioxidant and the ultraviolet absorber be used in combination.

(Method of Manufacturing Conductive Polymer Dispersion)

The above-described conductive polymer dispersion can be manufactured by the following method.

A mixture containing an oxidation catalyst is added to one or more of monomer components constituting a π-conjugated conductive polymer in the presence of a polyanion and a dispersion medium, and stirring is carried out for 0.1 hours to 120 hours under ice cooling or under heating reflux, and preferably under ice cooling or under room temperature, thereby performing chemical oxidation polymerization. As the oxidation catalyst used, a known oxidation catalyst can be used, and, for example, persulfates, such as ammonium persulfate, potassium persulfate, sodium persulfate, barium persulfate, and calcium persulfate, and transition metals, such as iron, copper, cerium, and chromium, can also be used. Among these, persulfates are preferable, and ammonium persulfate is particularly preferable. Further, an oxidizing agent, such as ferric sulfate, ferric chloride, or potassium permanganate, may be used in combination. It is preferable that ammonium persulfate and ferric sulfate be used in combination. The obtained reaction mixture is purified by a general chemical operation, and, for example, the purification of the reaction mixture can be performed by repeating the operations of adding water or another dispersion medium and removing a part of a solvent by ultrafiltration several times. Thus, a dispersion (hereinafter, referred to as a "PEDOT-PSS dispersion") in which a π-conjugated conductive polymer is solubilized by a polyanion is obtained.

The polyester resin (1) and the glycidyl group-containing acrylic resin are added to the obtained PEDOT-PSS dispersion, thereby obtaining the conductive polymer dispersion of the present invention. When the polyester resin (1) and the glycidyl group-containing acrylic resin are added to the obtained PEDOT-PSS dispersion, a premixture of the polyester resin (1) or dispersion thereof with the glycidyl group-containing acrylic resin or dispersion thereof can be added to the PEDOT-PSS dispersion, or the polyester resin (1) or dispersion thereof and the glycidyl group-containing acrylic resin or dispersion thereof can be respectively separately added to the PEDOT-PSS dispersion. For example, the PEDOT-PSS dispersion contains the π-conjugated conductive polymer and the polyanion in a total amount of 0.1% by mass to 30% by mass, preferably 0.3% by mass to 20% by mass, and further preferably 0.5% by mass to 5% by mass with respect to the total mass of the PEDOT-PSS dispersion, and a mixture of a dispersion containing the polyester resin (1) in the above ratio and a dispersion containing the glycidyl group-containing acrylic resin in the above ratio is added to this PEDOT-PSS dispersion at room temperature, thereby obtaining the conductive polymer dispersion of the present invention.

(Operation Effect)

The conductive polymer dispersion of the present invention contains the polyester resin (1) and the glycidyl group-containing acrylic resin as a binder of a complex of a π-conjugated conductive polymer and a polyanion. Therefore, the complex of a π-conjugated conductive polymer and a polyanion can be strongly fixed to a substrate to be coated with the conductive polymer dispersion. Further, since the polyester resin (1) and the glycidyl group-containing acrylic resin are self-crosslinked, the strength of a coating film becomes high. Therefore, according to the conductive polymer dispersion of the present invention, a conductive coating film having both excellent water resistance and excellent solvent resistance can be easily formed.

<Conductive Coating Film>

The conductive coating film of the present invention is a conductive coating film formed by applying the above-described conductive polymer dispersion to a substrate. Therefore, this conductive coating film is excellent in both water resistance and solvent resistance. As the method of applying the conductive polymer dispersion, dipping, comma coating, spray coating, roll coating, and gravure printing are exemplified.

Specifically, the conductive polymer dispersion of the present invention is diluted as needed, and is applied onto a substrate using a known method. As the application method, a method using a bar coater capable of uniformly applying the conductive polymer dispersion onto the substrate to have a desired thickness can be exemplified. After the application, the coating film is preferably cured by heating treatment or the like. As the heat treatment, a general method, such as hot air heating or ultraviolet heating, can be employed. Specifically, it is possible to cure the coating film by drying the coating film at 70° C. to 150° C. for about 5 seconds to 300 seconds. In the case where the conductive polymer dispersion of the present invention is diluted at the time of applying this conductive polymer dispersion onto the substrate, the conductive polymer dispersion can be diluted with a solvent exemplified as the dispersion medium. As the solvent, water, methanol, ethanol, acetonitrile, N,N-dimethylformamide, or dimethyl sulfoxide is suitably used. Among these, water, methanol, or ethanol is preferable. Further, it is preferable to dilute the conductive polymer dispersion at a rate of approximately 3 times to 30 times.

The conductive coating film of the present invention has a thickness of 0.01 μm to 10 μm, preferably 0.02 μm to 5 μm, and further preferably 0.03 μm to 1 μm. The thickness of the conductive coating film can be adjusted by selecting an appropriate bar coater at the time of applying the conductive polymer dispersion of the present invention onto the substrate. Further, the thickness of the conductive coating film can be measured by AFM, surface roughness meter, or the like. Here, in the case where the coating film has irregularities, the thickness of the coating film refers to average thickness of the irregularities.

As the substrate to be coated with the conductive polymer dispersion, a resin film or paper is exemplified.

Examples of resin materials constituting the resin film include polyethylene, polypropylene, polystyrene, polyvinyl chloride, polyvinyl alcohol, polyethylene terephthalate, polybutylene terephthalate, polyethylene naphthalate, acrylic resin, polycarbonate, polyvinylidene fluoride, polyarylate, styrene elastomers, polyester elastomers, polyether sulfone, polyether imide, polyether ether ketone, polyphenylene sulfide, polyimide, polycarbonate, cellulose triacetate, and cellulose acetate propionate. Among these resin materials, from the viewpoint of transparency, flexibility, pollution prevention properties, and strength, polyethylene terephthalate is preferable.

As the paper, high-quality paper, kraft paper, coated paper, or the like can be used.

The above-described substrate including the conductive coating film formed by the application of the conductive polymer dispersion is also one aspect of the present invention. As described above, since the conductive polymer dispersion of the present invention contains the polyester resin (1) and the glycidyl group-containing acrylic resin as a binder of a complex of a π-conjugated conductive polymer and a polyanion, the complex of a π-conjugated conductive polymer and a polyanion can be strongly fixed to the substrate. As the substrate including the conductive coating film of the present invention, there can be exemplified an aspect in which the conductive coating film of the present invention having a thickness of 0.01 μm to 10 μm is formed on one side of a polyethylene terephthalate-containing polyester substrate having a thickness of 25 μm to 250 μm. Since the surface of the substrate including this conductive polymer film, the surface being provided with the conductive polymer film of the present invention, is formed from the conductive polymer dispersion of the present invention, both water resistance and solvent resistance are excellent.

As specific aspects of the conductive polymer dispersion of the present invention, the conductive coating film formed by the application of the conductive polymer dispersion, and the substrate including the conductive coating film formed by the application of the conductive polymer dispersion, the following aspects are exemplified, but are not limited thereto.

(1-1): the conductive polymer dispersion of the present invention in which the π-conjugated conductive polymer is a polymer selected from the group consisting of polypyrrole and poly(3,4-ethylenedioxythiophene), the conductive coating film, or the substrate including the conductive coating film.

(1-2): the conductive polymer dispersion of the present invention in which the π-conjugated conductive polymer is poly(3,4-ethylenedioxythiophene), the conductive coating film, or the substrate including the conductive coating film.

(2-1): the conductive polymer dispersion of the present invention in which the polyanion is a polyanion selected from the group consisting of polystyrene sulfonic acid and copolymers containing the polystyrene sulfonic acid, the conductive coating film, or the substrate including the conductive coating film.

(2-2): the conductive polymer dispersion of the present invention in which the polyanion is polystyrene sulfonic acid, the conductive coating film, or the substrate including the conductive coating film.

(3-1): the conductive polymer dispersion of the present invention in which the polyester resin (1) is a polycondensate of a dicarboxylic acid component selected from sulfoterephthalic acid, 5-sulfoisophthalic acid, 4-sulfoisophthalic acid, 4-sulfonaphthalene-2,7-dicarboxylic acid, sodium salts thereof, and potassium salts thereof, and a glycol component containing one or more glycols selected from ethylene glycol and diethylene glycol, the conductive coating film, or the substrate including the conductive coating film.

(3-2): the conductive polymer dispersion of the present invention in which the polyester resin (1) is a polycondensate of a dicarboxylic acid component selected from 5-sulfoisophthalic acid, sodium 5-sulfoisophthalate, and potassium 5-sulfoisophthalate, and a glycol component containing one or more glycols selected from ethylene glycol and diethylene glycol, the conductive coating film, or the substrate including the conductive coating film.

(3-3): the conductive polymer dispersion of the present invention in which the polyester resin (1) is a polycondensate of a dicarboxylic acid component selected from 5-sulfoisophthalic acid, sodium 5-sulfoisophthalate, and potassium 5-sulfoisophthalate, and a glycol component containing diethylene glycol, the conductive coating film, or the substrate including the conductive coating film.

(4-1): the conductive polymer dispersion of the present invention in which the glycidyl group-containing acrylic resin is a polymer of a glycidyl group-containing radical-polymerizable unsaturated monomer selected from the group consisting of glycidyl acrylate, glycidyl methacrylate, and allyl glycidyl ether, the conductive coating film, or the substrate including the conductive coating film.

(4-2): the conductive polymer dispersion of the present invention in which the glycidyl group-containing acrylic resin is a polymer of glycidyl methacrylate, the conductive coating film, or the substrate including the conductive coating film.

(5-1): the conductive polymer dispersion of the present invention which is a combination of the above (1-1) or (1-2) and the above (2-1) or (2-2), (3-1), (3-2) or (3-3), (4-1) or (4-2), or (5-1) or (5-2), the conductive coating film, or the substrate including the conductive coating film.

(5-2): the conductive polymer dispersion of the present invention which is a combination of the above (2-1) or (2-2) and the above (1-1) or (1-2), (3-1), (3-2) or (3-3), (4-1) or (4-2), or (5-1) or (5-2), the conductive coating film, or the substrate including the conductive coating film.

(5-3): the conductive polymer dispersion of the present invention which is a combination of the above (3-1), (3-2) or (3-3) and the above (1-1) or (1-2), (2-1) or (2-2), (4-1) or (4-2), or (5-1) or (5-2), the conductive coating film, or the substrate including the conductive coating film.

(5-4): the conductive polymer dispersion of the present invention which is a combination of the above (4-1) or (4-2) and the above (1-1) or (1-2), (2-1) or (2-2), (3-1), (3-2) or (3-3), or (5-1) or (5-2), the conductive coating film, or the substrate including the conductive coating film.

(5-5): the conductive polymer dispersion of the present invention which is a combination of the above (5-1) or (5-2) and the above (1-1) or (1-2), (2-1) or (2-2), (3-1), (3-2) or (3-3), or (4-1) or (4-2), the conductive coating film, or the substrate including the conductive coating film.

EXAMPLES (Preparation Example 1) Preparation of Polystyrene Sulfonic Acid 206 g of sodium polystyrene sulfonate was dissolved in 1000 ml of ion-exchange water, 1.14 g of an ammonium persulfate solution previously dissolved in 10 ml of water was added dropwise thereto for 20 minutes with stirring at 80° C., and this solution was stirred for 12 hours.

1000 ml of sulfuric acid in a concentration of 10% by mass prepared by dilution was added to the obtained reaction solution, and about 1000 ml of the mixed solution was removed by ultrafiltration. 2000 ml of ion-exchange water was added to the remaining solution, and about 2000 ml of the mixed solution was removed by ultrafiltration. The above ultrafiltration was repeated three times.

Further, about 2000 ml of ion-exchange water was added to the obtained solution, and about 2000 ml of the mixed solution was removed by ultrafiltration. This ultrafiltration was repeated three times.

The water in the resulting solution was removed under reduced pressure, so as to obtain colorless solid polystyrene sulfonic acid having a molecular weight of 20,000.

(Preparation Example 2) Preparation of Aqueous Polystyrene Sulfonic Acid-Doped Poly(3,4-Ethylenedioxythiophene) Solution 14.2 g of 3,4-ethylenedioxythiophene and a solution in which 36.7 g of polystyrene sulfonic acid was dissolved in 2000 ml of ion-exchange water were mixed at 20° C.

A mixture of 200 ml of ion-exchange water, 29.64 g of ammonium persulfate, and 8.0 g of ferric sulfate was slowly added to the mixed solution obtained in this way while maintaining and stirring the mixed solution at 20° C., followed by stirring for 3 hours, so as to perform a reaction.

2000 ml of ion-exchange water was added to the obtained reaction solution, and about 2000 ml of the mixed solution was removed by ultrafiltration. This ultrafiltration was repeated three times.

200 ml of sulfuric acid in a concentration of 10% by mass prepared by dilution and 2000 ml of ion-exchange water were added to the obtained solution, and about 2000 ml of the mixed solution was removed by ultrafiltration. Then, 2000 ml of ion-exchange water was added thereto, and about 2000 ml of the mixed solution was removed by ultrafiltration. The above ultrafiltration was repeated three times.

Further, about 2000 ml of ion-exchange water was added to the obtained solution, and about 2000 ml of the mixed solution was removed by ultrafiltration. This ultrafiltration was repeated five times, so as to obtain 1.2% by mass of an aqueous polystyrene sulfonic acid-doped poly(3,4-ethylenedioxythiophene) solution (aqueous PEDOT-PSS solution).

(Preparation Example 3) Preparation of Polyester Resin 854 parts by mass of dimethyl terephthalate, 355 parts by mass of sodium 5-sulfoisophthalate, 186 parts by mass of ethylene glycol, 742 parts by mass of diethylene glycol, and 1 part by mass of zinc acetate were put into a four-neck flask provided with a distillation tube, a nitrogen introduction tube, a thermometer, and a stirrer. Thereafter, the inside of the flask was heated from 130° C. to 170° C. over 2 hours to perform an ester exchange reaction. Then, 730 parts by mass of isophthalic acid and 1 part by mass of antimony trioxide were added thereto, and the inside of the flask was heated from 170° C. to 200° C. over 2 hours to perform an esterification reaction. Subsequently, the temperature was gradually raised, the pressure was gradually reduced, and finally a polycondensation reaction was performed for 1 hour under a reaction temperature of 250° C. and a vacuum degree of 5 mmHg or lower. Thereafter, cooling was performed, and ion-exchange water was added under normal pressure, so as to obtain a polyester resin having 25% by mass of a nonvolatile content.

(Preparation Example 4) Preparation of Glycidyl Group-Containing Acrylic Resin A 18 parts by mass of ion-exchange water and 3 parts by mass of ELEMINOL RS-3000 (manufactured by Sanyo Chemical Industries, Ltd., anionic surfactant, 50% by mass of active ingredient) were put into a beaker. Thereafter, with stirring in the beaker, 40 parts by mass of glycidyl methacrylate was added, so as to prepare a monomer emulsion.

Subsequently, 37.5 parts by mass of ion-exchange water, 1 part by mass of a surfactant (ELEMINOL RS-3000), and 0.5 parts by mass of potassium persulfate were put into a four-neck flask provided with a condenser, a monomer dropping funnel, a thermometer, and a stirrer. Thereafter, after nitrogen substitution with stirring in the flask, heating was started, and the monomer emulsion was added dropwise over 4 hours at 75° C. Even after the completion of the dropping, the reaction proceeded by maintaining the liquid temperature at 75° C. to 85° C., and cooling was performed after 4 hours from the completion of the dropping. After the cooling, ion-exchange water was further added, so as to obtain a glycidyl group-containing acrylic resin A having 25% by mass of a nonvolatile content.

(Preparation Example 5) Preparation of Glycidyl Group-Containing Acrylic Resin B A glycidyl group-containing acrylic resin B having 25% by mass of a nonvolatile content was obtained in the same manner as in Preparation Example 4, except that 20 parts by mass of glycidyl methacrylate, 13.6 parts by mass of methyl methacrylate, and 6.4 parts by mass of butyl acrylate were added instead of putting 40 parts by mass of glycidyl methacrylate into the beaker.

(Preparation Example 6) Preparation of Self-Crosslinkable Resin C

The polyester resin obtained in Preparation Example 3 and the glycidyl group-containing acrylic resin A obtained in Preparation Example 4 were combined at a solid mass ratio of 50/50, so as to obtain a self-crosslinkable resin C having 25% by mass of a nonvolatile content.

(Preparation Example 7) Preparation of Self-Crosslinkable Resin D

The polyester resin obtained in Preparation Example 3 and the glycidyl group-containing acrylic resin B obtained in Preparation Example 5 were combined at a solid mass ratio of 50/50, so as to obtain a self-crosslinkable resin D having 25% by mass of a nonvolatile content.

Example 1

50 g of the aqueous PEDOT-PSS solution obtained in Preparation Example 2 and 50 g of the self-crosslinkable resin C obtained in Preparation Example 6 were mixed, so as to obtain a conductive polymer dispersion. The obtained conductive polymer dispersion was diluted 10-fold by the addition of methanol, applied to one side of a polyethylene terephthalate film (LUMIRROR T60, manufactured by TORAY INDUSTRIES, INC.) using bar coater #4, and dried at 100° C. for 30 seconds. In this way, a conductive coating film was formed, so as to obtain a conductive sheet.

In this Example, the ratio ($\alpha/\beta$) of total mass $\alpha$ of the polyester resin and the glycidyl group-containing acrylic resin to total mass $\beta$ of the $\pi$-conjugated conductive polymer and the polyanion was 20.8.

Example 2

A conductive sheet was obtained in the same manner as in Example 1, except that the amount of the aqueous PEDOT-PSS solution in Example 1 was changed to 25 g and the amount of the self-crosslinkable resin C in Example 1 was changed to 75 g.

In this Example, the ratio ($\alpha/\beta$) of total mass $\alpha$ of the polyester resin and the glycidyl group-containing acrylic resin to total mass $\beta$ of the $\pi$-conjugated conductive polymer and the polyanion was 62.5.

Example 3

A conductive sheet was obtained in the same manner as in Example 1, except that the amount of the aqueous PEDOT- PSS solution in Example 1 was changed to 75 g and the amount of the self-crosslinkable resin C in Example 1 was changed to 25 g.

In this Example, the ratio (α/β) of total mass α of the polyester resin and the glycidyl group-containing acrylic resin to total mass of the π-conjugated conductive polymer and the polyanion was 6.9.

Example 4

A conductive sheet was obtained in the same manner as in Example 1, except that the bar coater #4 in Example 1 was changed to a bar coater #8.

Example 5

A conductive sheet was obtained in the same manner as in Example 1, except that the self-crosslinkable resin C in Example 1 was changed to self-crosslinkable resin D.

Example 6

A conductive sheet was obtained in the same manner as in Example 1, except that 1.25 g of gallic acid was added in addition to 50 g of the aqueous PEDOT-PSS solution in Example 1 and 50 g of the self-crosslinkable resin C in Example 1.

Example 7

A conductive sheet was obtained in the same manner as in Example 1, except that the amount of the aqueous PEDOT-PSS solution in Example 1 was changed to 20 g and the amount of the self-crosslinkable resin C in Example 1 was changed to 80 g.

In this Example, the ratio (α/β) of total mass α of the polyester resin and the glycidyl group-containing acrylic resin to total mass β of the π-conjugated conductive polymer and the polyanion was 83.3.

Example 8

A conductive sheet was obtained in the same manner as in Example 1, except that the amount of the aqueous PEDOT-PSS solution in Example 1 was changed to 80 g and the amount of the self-crosslinkable resin C in Example 1 was changed to 20 g.

In this Example, the ratio (α/β) of total mass α of the polyester resin and the glycidyl group-containing acrylic resin to total mass β of the π-conjugated conductive polymer and the polyanion was 5.2.

Comparative Example 1

A sheet was obtained in the same manner as in Example 1, except that the aqueous PEDOT-PSS solution in Example 1 was changed to water.

Comparative Example 2

A sheet was obtained in the same manner as in Example 2, except that the aqueous PEDOT-PSS solution in Example 2 was changed to water.

Comparative Example 3

A sheet was obtained in the same manner as in Example 3, except that the aqueous PEDOT-PSS solution in Example 3 was changed to water.

Comparative Example 4

A sheet was obtained in the same manner as in Example 4, except that the aqueous PEDOT-PSS solution in Example 4 was changed to water.

Comparative Example 5

A sheet was obtained in the same manner as in Example 5, except that the aqueous PEDOT-PSS solution in Example 5 was changed to water.

Comparative Example 6

A conductive sheet was obtained in the same manner as in Example 1, except that the self-crosslinkable resin C in Example 1 was changed to the polyester resin obtained in Preparation Example 3, that is, the glycidyl group-containing acrylic resin was not contained.

The surface resistance values of the obtained sheets were measured as follows, and the water resistance and solvent resistance thereof were evaluated as follows. Measurement results and evaluation results are given in Table 1.

[Surface Resistance Value]

The surface resistance values (Ω) of the obtained sheets were measured according to JIS K6911 using HIRESTA manufactured by Mitsubishi Chemical Corporation. The term "over" in the table means that the surface resistance value is high to such an extent to exceed a measurable range.

[Water Resistance]

The conductive coating film was reciprocally rubbed ten times using a nonwoven fabric impregnated with deionized water while applying a pressing load of 1 kPa. After rubbing, the state of the coating film was visually evaluated according to the following criteria.

A: Change of the conductive coating film was not observed.

B: Scratches were observed on the conductive coating film.

C: A part of the conductive coating film was scraped off.

[Solvent Resistance]

The conductive coating film was reciprocally rubbed ten times using a nonwoven fabric impregnated with methyl ethyl ketone (MEK) or toluene while applying a pressing load of 1 kPa. After rubbing, the state of the coating film was visually evaluated according to the following criteria.

A: Change of the conductive coating film was not observed.

B: Scratches were observed on the conductive coating film.

C: A part of the conductive coating film was scraped off.

TABLE 1

| | α/β* | Self-crosslinkable resin | Addition of gallic acid | Bar coater | Surface resistance (Ω/□) | Water resistance evaluation | Solvent resistance evaluation MEK | Solvent resistance evaluation Toluene |
|---|---|---|---|---|---|---|---|---|
| Example 1 | 20.8 | C | Not added | #4 | $2 \times 10^9$ | A | A | A |
| Example 2 | 62.5 | C | Not added | #4 | $7 \times 10^{11}$ | A | A | A |
| Example 3 | 6.9 | C | Not added | #4 | $3 \times 10^8$ | A | A | A |
| Example 4 | 20.8 | C | Not added | #8 | $2 \times 10^9$ | A | A | A |
| Example 5 | 20.8 | D | Not added | #4 | $2 \times 10^{10}$ | A | A | A |
| Example 6 | 20.8 | C | Added | #4 | $2 \times 10^8$ | A | A | A |
| Example 7 | 83.3 | C | Not added | #4 | $2 \times 10^{11}$ | B | B | B |
| Example 8 | 5.2 | C | Not added | #4 | $1 \times 10^8$ | B | B | B |
| Comparative Example 1 | — | C | Not added | #4 | over | C | C | C |
| Comparative Example 2 | — | C | Not added | #4 | over | C | C | C |
| Comparative Example 3 | — | C | Not added | #4 | over | C | C | C |
| Comparative Example 4 | — | C | Not added | #8 | over | C | C | C |
| Comparative Example 5 | — | D | Not added | #4 | over | C | C | C |
| Comparative Example 6 | 20.8 | Only polyester resin alkali metal salt | Not added | #4 | $2 \times 10^{11}$ | C | C | C |

*α/β is a ratio of total mass α of polyester resin alkali metal salt and glycidyl group-containing acrylic resin to total mass β of π-conjugated conductive polymer and polyanion.

The conductive coating films of Examples 1 to 8, particularly, Examples 1 to 6, each of which is formed of a conductive polymer dispersion containing PEDOT-PSS, a polyester resin, and a glycidyl group-containing acrylic resin, had both high water resistance and high solvent resistance.

The conductive coating films of Example 6, which further contained gallic acid, had a low surface resistance value and excellent conductivity, compared to the conductive coating film of Example 1, which contained the same amount of PEDOT-PSS.

The coating films of Comparative Examples 1 to 5, each of which does not contain PEDOT-PSS, had a high surface resistance value to such a degree of exceeding a measurable range, and has low water resistance and low solvent resistance.

The conductive coating film of Comparative Example 6, which was formed of a conductive polymer dispersion containing PEDOT-PSS and a polyester resin, not containing a glycidyl group-containing acrylic resin, had a high surface resistance value and low conductivity, compared to the conductive coating films of Examples 1 and 5, each of which contained the same amount of PEDOT-PSS. Further, the conductive coating film of Comparative Example 6 had low water resistance and low solvent resistance.

As described above, in the conductive coating films, even in the case where only the polyester resin (1) was contained in addition to PEDOT-PSS, water resistance and solvent resistance were not exhibited, and in the case where the polyester resin (I) and the glycidyl group-containing acrylic resin were contained in addition to PEDOT-PSS, water resistance and solvent resistance were improved.

Further, even with respect to the conductivity of the conductive coating films, in the case where the polyester resin (1) and the glycidyl group-containing acrylic resin were contained in addition to PEDOT-PSS, the conductivity thereof was improved.

INDUSTRIAL APPLICABILITY

According to the conductive polymer dispersion of the present invention, a conductive coating film having both excellent water resistance and excellent solvent resistance can be easily formed. The conductive coating film of the present invention has both excellent water resistance and excellent solvent resistance.

The invention claimed is:

1. A conductive polymer dispersion, comprising:
   π-conjugated conductive polymer;
   a polyanion;
   a polyester resin having an alkali metal salt of an acid group; and
   a glycidyl group-containing acrylic resin,
   wherein a ratio (α/β) of total mass α of the polyester resin and the glycidyl group-containing acrylic resin to total mass β of the π-conjugated conductive polymer and the polyanion is in a range of 6.90 to 62.5.

2. The conductive polymer dispersion according to claim 1,
   wherein the polyester resin is a polycondensate of a dicarboxylic acid component and a diol component,
   the dicarboxylic acid component includes a dicarboxylic acid having a sulfonic acid alkali metal salt type substituent group, and
   the diol component includes diethylene glycol, wherein the sulfonic acid alkali metal salt type substituent group is a group represented by —$SO_3^-X^+$, wherein $X^+$ is an alkali metal ion.

3. The conductive polymer dispersion according to claim 1, further comprising a conductivity improver.

4. The conductive polymer dispersion according to claim 3,
   wherein the conductivity improver is gallic acid or an ester of gallic acid.

5. A conductive coating film formed by applying the conductive polymer dispersion according to claim 1.

* * * * *